(12) United States Patent
Svensson

(10) Patent No.: US 8,459,894 B2
(45) Date of Patent: Jun. 11, 2013

(54) EXPANDABLE SEALED PIVOT SYSTEM WITH COMPONENT LOCK/UNLOCK FUNCTION

(75) Inventor: Roger Svensson, Cottonwood, AZ (US)

(73) Assignee: Expander Americas, Inc., Cottonwood, AZ (US)

( * ) Notice: Subject to any disclaimer, the term of this patent is extended or adjusted under 35 U.S.C. 154(b) by 0 days.

(21) Appl. No.: 13/297,813

(22) Filed: Nov. 16, 2011

(65) Prior Publication Data

US 2012/0121319 A1 May 17, 2012

Related U.S. Application Data

(60) Provisional application No. 61/414,295, filed on Nov. 16, 2010.

(51) Int. Cl.
*F16C 11/02* (2006.01)
(52) U.S. Cl.
USPC ............. 403/154; 403/153; 403/370; 37/466
(58) Field of Classification Search
USPC ................. 403/150, 153, 154, 156, 368, 370, 403/371; 37/466, 468
See application file for complete search history.

(56) References Cited

U.S. PATENT DOCUMENTS

| | | | | |
|---|---|---|---|---|
| 3,129,966 A | * | 4/1964 | Blank | 403/156 |
| 3,997,274 A | * | 12/1976 | Iverson | 403/10 |
| 4,251,182 A | * | 2/1981 | Schroeder | 414/723 |
| 4,398,862 A | * | 8/1983 | Schroeder | 414/723 |
| 4,507,005 A | * | 3/1985 | Siewert et al. | 403/16 |
| 4,652,167 A | * | 3/1987 | Garman | 403/158 |
| 5,769,557 A | * | 6/1998 | Beals et al. | 403/162 |
| 6,322,280 B1 | * | 11/2001 | Coyne | 403/158 |
| 7,309,186 B2 | * | 12/2007 | Oertley | 403/288 |
| 8,037,783 B2 | * | 10/2011 | Aare | 74/579 R |

* cited by examiner

*Primary Examiner* — Joshua Kennedy
(74) *Attorney, Agent, or Firm* — Weiss & Moy, P.C.; Jeffrey D. Moy

(57) ABSTRACT

A sealed pivot assembly with lock/unlocking functionality has an axis member having a plurality of threaded openings formed in both a first and a second end member. A pair of locking sleeves is positioned over each of the first end and second end of the axis member. An expansion sleeves is positioned over each of the pair of locking sleeves. Locking devices are inserted into the openings formed in each end of the axis member, the locking devices engaging the pair of expansion sleeves causing the expansion sleeves to expand to secure the axis member in the mounting lugs. A threaded dismounting tool may be positioned in one threaded hole to force the axis member axially causing the expansion sleeves to loosen.

17 Claims, 4 Drawing Sheets

EXPANDABLE SEALED PIVOT SYSTEM WITH COMPONENT LOCK/UNLOCK FUNCTION

RELATED APPLICATIONS

The present patent application is related to U.S. Provisional Application Ser. No. 61/414,295, filed Nov. 16, 2010, in the name of the same inventor listed above, and entitled, "EXPANDABLE SEALED PIVOT SYSTEM WITH COMPONET LOCK/UNLOCK FUNCTION". The present patent application claims the benefit under 35 U.S.C. §119(e)

FIELD OF INVENTION

This invention relates generally to a pivot system that allows two machine element members to pivot around a fixed axis, and more specifically, to an expandable sealed pivot system with component lock/unlock function.

BACKGROUND OF THE INVENTION

The conventional way to achieve pivotability in a connection between two machine parts is to use a hinge journalled in bearings, comprising one or more bearings arranged inside one machine member and a cylindrical pin hinging through the bushing and a pair of mounting lugs without mounting hole locking capabilities, attached by various methods to the outside of one mounting lug, to prevent the pin from falling out when linkage wear appears. The surface between the cylindrical part of the pin and the inner diameter of the bushing is greased through a grease channel, either through the pin or through the connecting machine member and the bushing.

A design for pivot solution exists, but with severe failure rate. The system creates an oil chamber by introducing o-rings between a number of bushings with the intention of axially sealing for oil leakage.

The system fails prematurely due to several different circumstances. Seals fail and the impact of extreme environment such as heat, cold, dust etc. Once one of the several seals break, the oil, due to its viscosity drains in a matter of minutes. Since the failure is unlikely to be noticed in this short period of time, the whole pivot start getting hot due to friction and a quick process is initiated where the temperature raises quickly until the materials in the pivot assembly seizes and is extremely difficult to take apart, since the different parts act as if they have been welded together. Another contributing factor is the inevitable and common problem of wear between the mounting lug hole and the mounting lug bushing as well as between the mounting lug bushing and the pivot pin. There are also the inevitable and common wear problem between the pivot pin and the inner circumference of the lubed center bushing as well as between the outer circumference of the center and the machine element which is the bushing housing. Due to the wear problem when two cylindrical machine elements move around an axis, the system has no locking mechanism and is solely depending on a tight tolerance between the parts. It has been proven over time that depending on tight tolerances to keep the system together is simply not dependable and is unacceptable.

Therefore, it would be desirable to provide a system and method that overcomes the above.

SUMMARY

A sealed pivot assembly with lock/unlocking functionality has an axis member having a first end member and a second end member, a plurality of threaded openings formed in both the first and second end member. A pair of locking sleeves is provided, wherein one of the pair of locking sleeves is positioned over each of the first end and second end of the axis member. A pair of expansion sleeves is provided, wherein one of the pair of expansion sleeves is positioned over each of the pair of locking sleeves. A plurality of locking devices is provided, wherein at least two locking devices are inserted into the openings formed in each end of the axis member, the locking devices engaging the pair of expansion sleeves causing the expansion sleeves to expand to secure the axis member in the mounting lugs. At least one threaded dismounting tool is provided, the at least one threaded dismounting tool positioned in the at least one threaded hole in at least one tension washer to force the axis member axially causing the expansion sleeves to loosen.

BRIEF DESCRIPTION OF THE DRAWINGS

Embodiments of the disclosure will become more fully understood from the detailed description and the accompanying drawings, wherein.

DETAILED DESCRIPTION

Parts Description

Figure 1A:
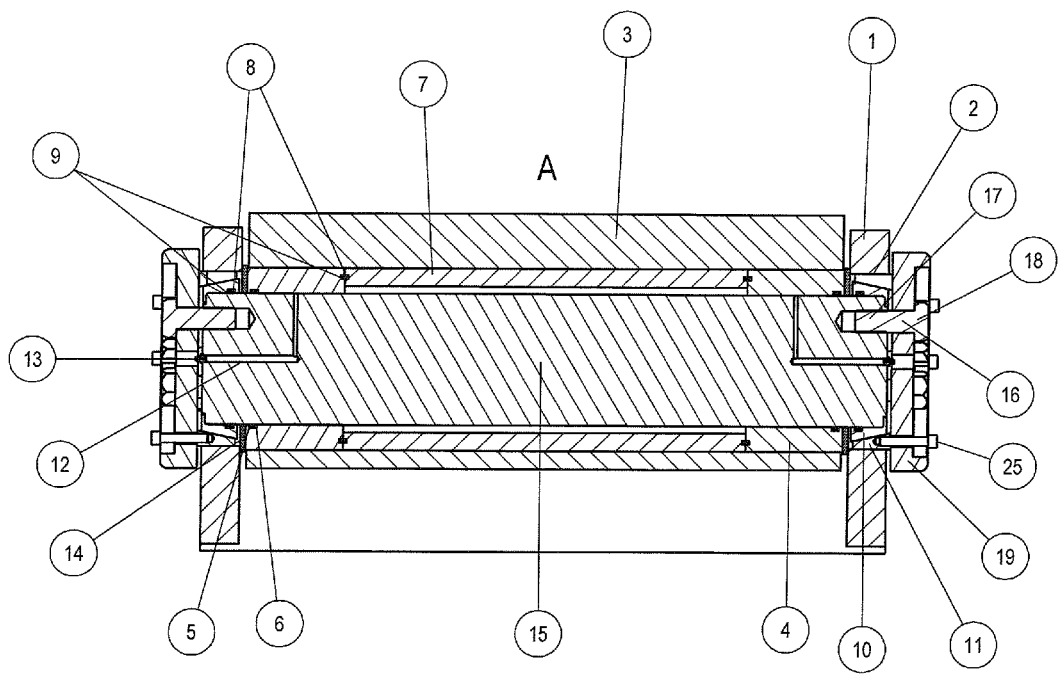
FIG. 1A is a cross-sectional view of one embodiment of the present invention in install locking mode.
Figure 1B:
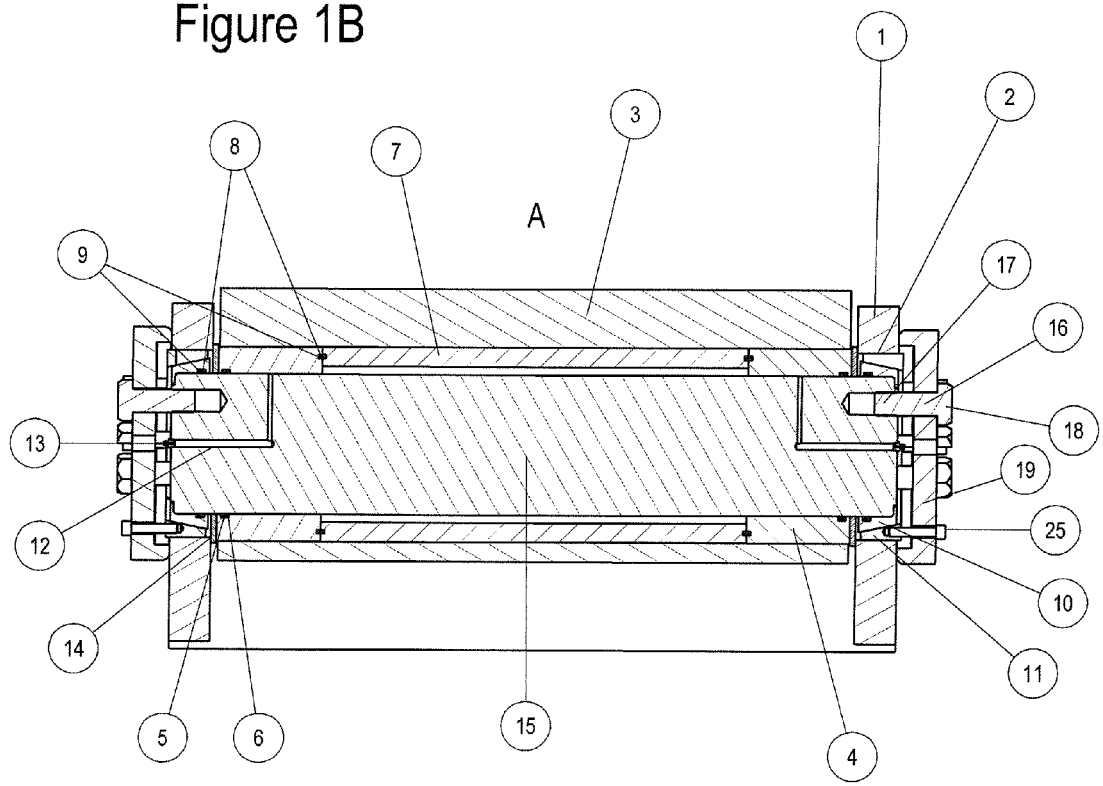
FIG. 1B is a cross-sectional view of one embodiment of the present invention in dismount unlocking mode.
Figure 2A:
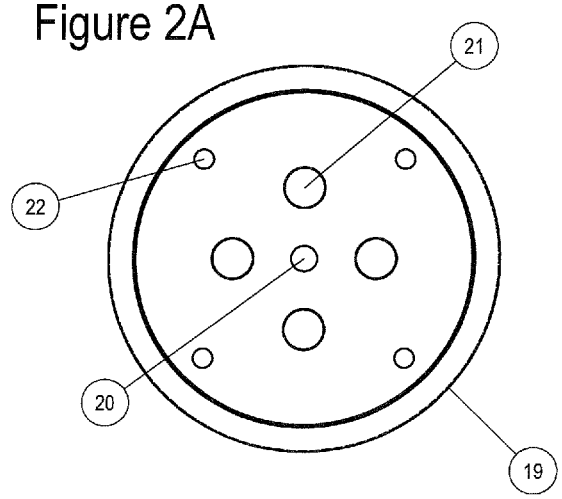
FIG. 2A is a front view of the present inventions tension washer.
Figure 2B:
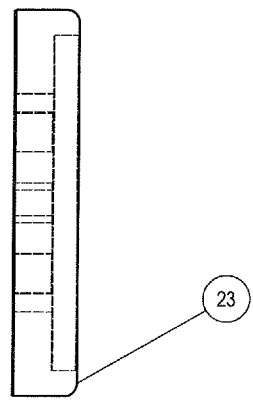
FIG. 2B is a cross-sectional side view of FIG. 2A.
Figure 3:
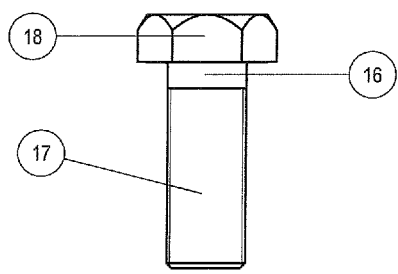
FIG. 3 is a perspective view of a locking member used in the present invention.
Figure 4:
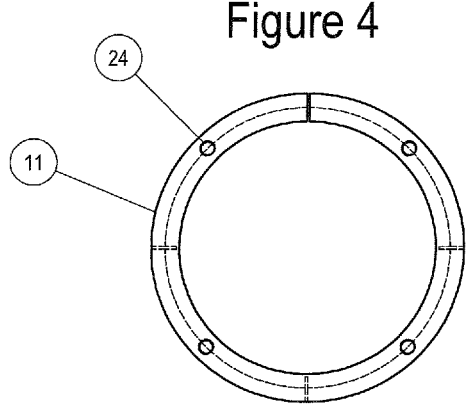
FIG. 4 is a front view of the expandable locking sleeve used in the present invention.
Figure 5:
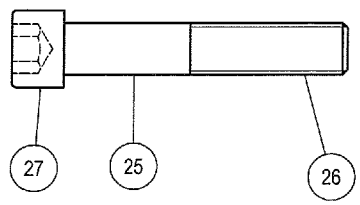
FIG. 5 is a perspective view of a unlocking member used in the present invention.
Figure 6:
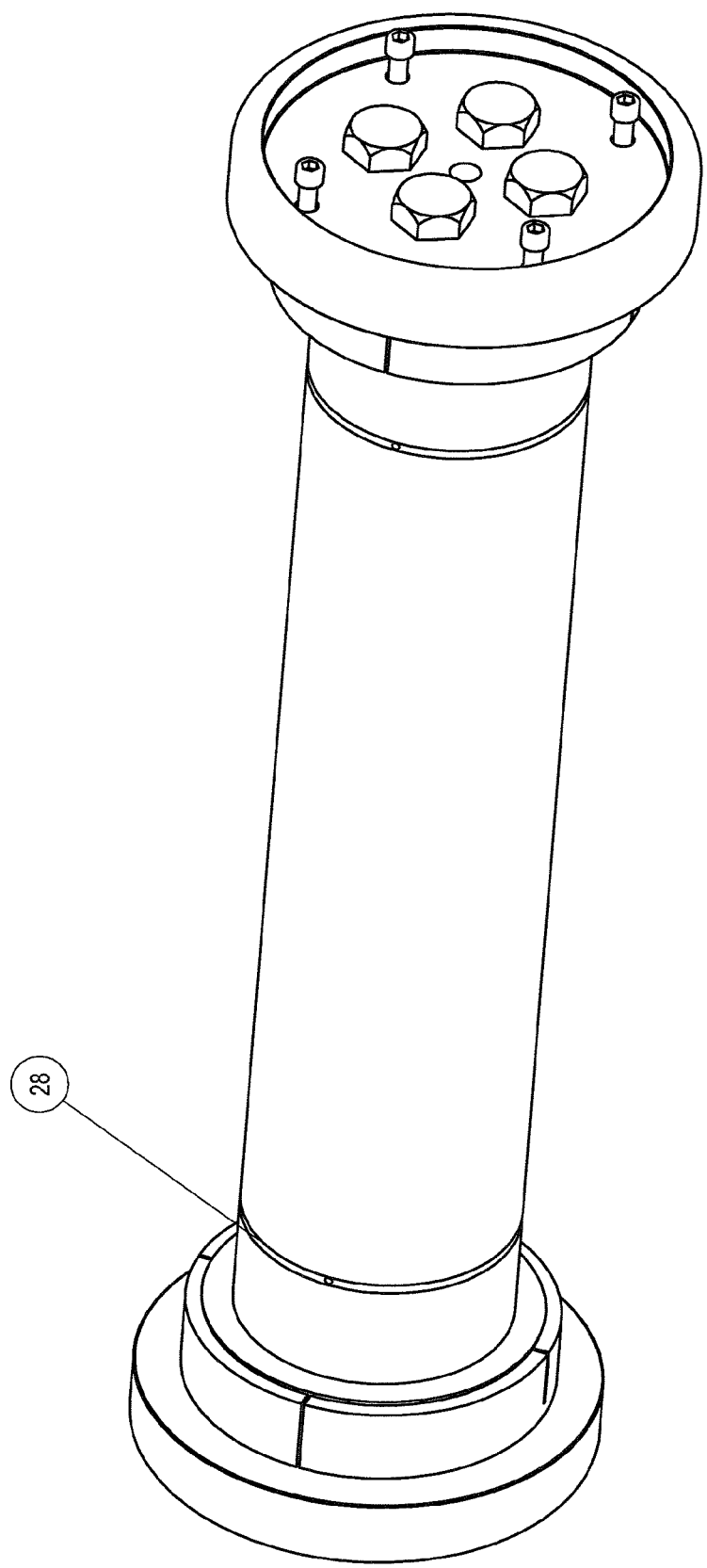
FIG. 6 is a perspective view of the pivoting grease groove member used in the present invention.

1) Mounting lug members
2) Mounting lug hole
3) Machine member housing
4) Pivot axis chamber member
5) Rotating friction seal groove
6) Rotating friction seal
7) Pivot axis chamber member spacer
8) Static seal groove
9) Static grease chamber member radial seal
10) Sealed component locking sleeve member
11) Expandable locking sleeve
12) Grease distribution channel
13) Grease nipple
14) Rotating friction spacer
15) Pivot system axis member
16) Locking member
17) Threaded end locking member
18) Torque head locking member
19) Tension washer member
20) Lubrication access cylinder
21) Component lock passage hole member
22) Component unlock passage hole member
23) Tension washer unlock spacer member
24) Threaded component unlock member
25) Unlocking member 26) Threaded end unlocking member
27) Torque head unlocking member
28) Pivoting grease groove member
29) Threaded component unlock passage hole member The present invention is expandable pivot system A with component lock/unlock function, comprised of a range of functionalities as will be described below.

An expandable pivot system A for providing a mechanical multi locking mechanism in a pair of mounting lug members 1 has a straight cylindrical system axis member 15, having a pair of end members with four or more threaded locking member holes 29, a grease distribution channel 12 and grease nipple thread 13. The grease distribution channel 12 and grease nipple thread 13 may be used to distribute lubricant to a pivoting grease groove member 28. The component luck/unlock function of the expandable sealed pivot system A engages when torque is applied on the locking members 16.

The machine housing member 3 houses the lock/unlock sealed pivot axis chamber members 4 and pivot axis spacer member 7. The inner end of the lock/unlock sealed pivot axis chamber members 4 and both sides of the pivot axis spacer member 7 has matching seal grooves 8 where static grease chamber member radial seal 9 are housed. The pivot axis chamber members 4 have a seal groove 5 inside the outer end to house the system rotating friction seals 6.

Rotating friction spacers 14 are fixed between the outer end of the lock/unlock sealed pivot axis chamber members 4 and the sealed component locking sleeve members 10.

A pair of expandable locking sleeve members 11, having threaded openings 24, a tension washer member 19, having an unlock spacer member 23, and multiple locking members 16, having a torque head locking member 18 and a threaded end 17, create a multi lock function by expanding into the mounting lug holes 2 by means of axial expansion as well as securing the component lock/unlock members in their respective housing.

The tension washer members 19 are comprised of at least nine holes. A lubrication access hole 20 is at the center of the tension washer member 19. Four locking members 16 and four holes of the tension washer member 19 are first used to center the pivot system axis member 4 and the sealed component locking sleeve member 10 and secondly to apply torque to the complete system assembly A and thereby fixate all components in their respective position and also lock the expandable pivot system to permanently eliminate any future wear.

When the tension washer member 19 is turned around in unlock mode, the four smaller holes 22 accommodate unlocking members 25 which forces the expandable locking sleeve member 11 axially in its direction causing the expandable locking sleeve 11 to loosen once the threaded unlock member 25, having a torque head 27 and a threaded member 26, and the locking members has been removed.

What is claimed is:

1. A sealed pivot assembly with lock/unlocking functionality comprising:
   an axis member having a first end member and a second end member, a plurality of threaded openings formed in both the first and second end member;
   a pair of locking sleeves, wherein one of the pair of locking sleeves is positioned over each of the first end and second end of the axis member;
   a pair of expansion sleeves, wherein one of the pair of expansion sleeves is positioned over each of the pair of locking sleeves, a plurality of threaded unlocking openings formed in each of the pair of expansion sleeves;
   a pair of tension washers, each tension washer having a plurality of holes, wherein at least one of the plurality of holes in each tension washer is threaded;
   a plurality of threaded locking devices, wherein at least one threaded locking device is inserted into one of the plurality of openings formed in each end of the axis member, the plurality of threaded locking devices engage the pair of tension washers causing the pair of tension washers to move towards the pair of expansion sleeves causing the expansion sleeves to expand to secure the axis member in the mounting lugs; and
   a plurality of threaded unlocking members, at least one threaded unlocking member positioned in the at least one threaded unlocking opening in one of the pair of expansion sleeves, wherein the plurality of threaded unlocking members force one of the pair of expansion sleeves axially causing one of the pair of expansion sleeves to loosen when the plurality of threaded unlocking members are removed.

2. A pivot assembly in accordance with claim 1, further comprising an axis chamber member spacer positioned within a machine housing member which houses the axis member.

3. A pivot assembly in accordance with claim 1, further comprising:
   seal grooves formed on both sides of the axis chamber member spacer; and
   static grease chamber member radial seals positioned in the seal grooves.

4. A pivot assembly in accordance with claim 1, further comprising:
   a pair of rotating friction seal grooves formed on the axis member; and
   a pair of rotating friction seal members, one rotating friction seal member housed in each of the rotating friction seal grooves.

5. A pivot assembly in accordance with claim 1, further comprising a pair of rotating friction spacers positioned between outer ends of the axis members and the locking sleeves.

6. A pivot assembly in accordance with claim 1, further comprising:
   a pair of grease channels formed on each end of the axis member; and
   a lubrication nipple attached to each of the pair of grease channels.

7. A pivot assembly in accordance with claim 1, wherein the plurality of holes in each of the pair of tension washers is five, wherein two of the five holes are threaded holes and one hole is a lubrication access cylinder.

8. A sealed pivot assembly with lock/unlocking functionality comprising:
   an axis member having a first end and a second end, a plurality of threaded openings formed in both the first and second end;
   an axis chamber member spacer positioned within a machine housing member which houses the axis member;
   a pair of grease channels formed on each end of the axis member;
   a lubrication nipple attached each of the pair of grease channels;
   a pair of locking sleeves, wherein one of the pair of locking sleeves is positioned over each of the first end and second end of the axis member
   a pair of expansion sleeves, wherein one of the pair of expansion sleeves is positioned over each of the pair of locking sleeves, a plurality of threaded unlocking openings formed in each of the pair of expansion sleeves;

a pair of tension washers, each tension washer having a plurality of holes, wherein at least one of the plurality of holes in each tension washer is threaded;

a plurality of threaded locking devices, wherein at least one threaded locking device is inserted into one of the plurality of openings formed in each end of the axis member, the plurality of threaded locking devices engage the pair of tension washers causing the pair of tension washers to move towards the pair of expansion sleeves causing the expansion sleeves to expand to secure the axis member in the mounting lugs; and a plurality of threaded unlocking members, at least one threaded unlocking member positioned in the at least one threaded unlocking opening in one of the pair of expansion sleeves, wherein the plurality of threaded unlocking members force one of the pair of expansion sleeves axially causing the one of the pair of expansion sleeves to loosen when the plurality of threaded unlocking members are removed.

9. A pivot assembly in accordance with claim 8, further comprising:

seal grooves formed on an inner end of the axis member and both sides of the axis chamber member spacer; and static grease chamber member radial seals positioned in the seal grooves.

10. A pivot assembly in accordance with claim 8, further comprising:

a pair of rotating friction seal grooves formed on the axis member; and a pair of rotating friction seal members, one rotating friction seal member housed in each of the rotating friction seal grooves.

11. A pivot assembly in accordance with claim 8, further comprising a pair of rotating friction spacers positioned between outer ends of the axis members and the locking sleeves.

12. A pivot assembly in accordance with claim 8, wherein the plurality of holes in each of the pair of tension washers is five, wherein two of the five holes are threaded holes and one hole is a lubrication access cylinder.

13. A sealed pivot assembly with lock/unlocking functionality comprising:

an axis member having a first end member and a second end member, a plurality of threaded openings formed in both the first and second end member;

an axis chamber member spacer positioned within a machine housing member which houses the axis member;

a pair of locking sleeves, wherein one of the pair of locking sleeves is positioned over each of the first end and second end of the axis member;

a pair of rotating friction spacers positioned between outer ends of the axis members and the locking sleeves;

a pair of expansion sleeves, wherein one of the pair of expansion sleeves is positioned over each of the pair of locking sleeves, a plurality of threaded unlocking openings formed in each of the pair of expansion sleeves;

a pair of tension washers, each tension washer having a plurality of holes, wherein at least one of the plurality of holes in each tension washer is threaded;

a plurality of threaded locking devices, wherein at least one threaded locking device is inserted into one of the plurality of openings formed in each end of the axis member, the plurality of threaded locking devices engage the pair of tension washers causing the pair of tension washers to move towards the pair of expansion sleeves causing the expansion sleeves to expand to secure the axis member in the mounting lugs; and a plurality of threaded unlocking members, at least one threaded unlocking member positioned in the at least one threaded unlocking opening in one of the pair of expansion sleeves, wherein the plurality of threaded unlocking members force one of the pair of expansion sleeves axially causing the one of the pair of expansion sleeves to loosen when the plurality of threaded unlocking members are removed.

14. A pivot assembly in accordance with claim 13, further comprising:

seal grooves formed on both sides of the axis chamber member spacer; and static grease chamber member radial seals positioned in the seal grooves.

15. A pivot assembly in accordance with claim 13, further comprising:

a pair of rotating friction seal grooves formed on the axis member; and a pair of rotating friction seal members, one rotating friction seal member housed in each of the rotating friction seal grooves.

16. A pivot assembly in accordance with claim 13, further comprising:

a pair of grease channels formed on each end of the axis member; and a lubrication nipple attached each of the pair of grease channels.

17. A pivot assembly in accordance with claim 13, wherein the plurality of holes in each of the pair of tension washers is five, wherein two of the five holes are threaded holes and one hole is a lubrication access cylinder.

\* \* \* \* \*